US012534304B2

(12) United States Patent
Wagner et al.

(10) Patent No.: US 12,534,304 B2
(45) Date of Patent: Jan. 27, 2026

(54) PROCESSING PLANT

(71) Applicant: Kleemann GmbH, Göppingen (DE)

(72) Inventors: Monika Wagner, Rechberghausen (DE); Benjamin Kazmaier, Owen (DE)

(73) Assignee: Kleemann GmbH, Göppingen (DE)

( * ) Notice: Subject to any disclaimer, the term of this patent is extended or adjusted under 35 U.S.C. 154(b) by 316 days.

(21) Appl. No.: 18/313,583

(22) Filed: May 8, 2023

(65) Prior Publication Data

US 2024/0150129 A1 May 9, 2024

(30) Foreign Application Priority Data

May 19, 2022 (DE) .................... 10 2022 112 640.4

(51) Int. Cl.
*B65G 41/00* (2006.01)
*B02C 21/02* (2006.01)
*B02C 23/12* (2006.01)

(52) U.S. Cl.
CPC .......... *B65G 41/001* (2013.01); *B02C 21/026* (2013.01); *B02C 23/12* (2013.01)

(58) Field of Classification Search
CPC .. B65G 41/001; B65G 41/005; B65G 41/008; B02C 21/026; B02C 23/12; B02C 2/04; B07B 1/005; B07B 13/16
See application file for complete search history.

(56) References Cited

U.S. PATENT DOCUMENTS

2003/0146315 A1* 8/2003 Boast ...................... B07B 13/16 241/34
2003/0173265 A1 9/2003 Cohen et al.
2004/0251351 A1 12/2004 Douglas et al.
2020/0199846 A1 6/2020 Dunstan et al.
2021/0101181 A1 4/2021 Belosevic et al.

FOREIGN PATENT DOCUMENTS

| | | | | | | |
|---|---|---|---|---|---|---|
| CA | 2903563 | C | * | 4/2020 | ............ | B07B 15/00 |
| CN | 111344071 | B | * | 9/2022 | ............ | B07B 1/005 |
| CN | 219506865 | U | * | 8/2023 | | |
| DE | 10305589 | A1 | | 8/2003 | | |
| DE | 102019126778 | A1 | | 4/2021 | | |
| EP | 3670760 | A2 | | 6/2020 | | |
| FR | 2722809 | A1 | | 1/1996 | | |

OTHER PUBLICATIONS

German Office Action for corresponding patent application No. 102022112640.4, dated Oct. 6, 2022, 10 pages (not prior art).
European Search Report for corresponding patent No. EP 23 17 1207, dated Oct. 17, 2023, 9 pages (not prior art).

* cited by examiner

*Primary Examiner* — Jacob S. Scott
*Assistant Examiner* — Miraj T. Patel
(74) *Attorney, Agent, or Firm* — Lucian Wayne Beavers; Patterson Intellectual Property Law, PC

(57) ABSTRACT

A processing plant includes a screen unit for screening out processing material, which can be routed to the screen unit from a crusher unit. The screen unit includes at least one screen deck and a discharge area via which the processing material exits the screen unit. A transfer belt located in a working position is disposed in the discharge area to receive processing material from the screen unit. To simplify maintenance the transfer belt is movable in a direction from the working position to a maintenance position wherein the transfer belt is at least partially moved out of the discharge area. A lifting device supports the transfer belt in the maintenance position by a hoist.

11 Claims, 5 Drawing Sheets

PROCESSING PLANT

RELATED APPLICATION

The present application claims priority to German Patent Application Ser. No. DE 10 2022 112 640.4 filed May 19, 2022, which is incorporated herein by reference.

BACKGROUND OF THE INVENTION

Field of the Invention

The invention relates to a processing plant having a screen unit for screening out processing material, which can be routed to the screen unit, in particular from a crusher unit, wherein the screen unit comprises at least one screen deck and the screen unit comprises a discharge area, via which the processing material exits the screen unit, wherein a transfer belt located in a working position is disposed in the discharge area to receive processing material from the screen unit in the discharge area, and wherein the transfer belt is disposed in a receiving area of the processing plant.

Description of the Prior Art

Processing plants according to the invention are used for processing, for instance crushing and/or screening, mineral material, for instance rock material, concrete or the like. They are used either as mobile or as stationary plants. A filler unit is used to fill the material to be processed into the plant. Excavators or wheel loaders are usually used for this purpose. Starting from the filling unit, a conveyor is used to route the processing material to a crusher unit. For instance, the crusher unit may be a jaw crusher, an impact crusher, or a cone crusher. In the crusher unit, the processing material is crushed and routed onto a crusher discharge conveyor. The crusher discharge conveyor supplies the processing material to a screen unit. The screen unit has at least one screen deck. The processing material is screened out via the screen deck and at least two rock fractions are formed at the screen deck. One rock fraction is passed onto a transfer belt. The transfer belt is used to discharge this rock fraction from the discharge area of the screen unit. The material may be transferred from the transfer belt to a discharge belt, for instance, to pile it up on a stockpile at the side of the processing plant or to load it onto a transport vehicle. Alternatively, the transfer belt can convey the material onto a crusher return belt to feed the material back to the crusher.

Sometimes cleaning or maintenance work has to be performed in the receiving area where the transfer belt is located. The pick-up area can include the discharge area of the screen unit. To make the pick-up area and/or the discharge area accessible, the transfer belt has to be removed and taken out of the pick-up area. Then, the discharge area behind the screen unit is easily accessible. Removing the transfer belt requires the use of external vehicles, such as an excavator, wheel loader or a forklift.

This procedure is relatively time-consuming and not always easy to perform.

SUMMARY OF THE INVENTION

The invention addresses the problem of providing a processing plant, in particular a mineral material machining plant, in which the receiving area for the transfer belt can be made easily accessible for cleaning, inspection or maintenance work.

This problem is solved in that an actuator of the processing plant can be used to move the transfer belt from the working position to a maintenance position along its conveying direction, wherein the transfer belt is at least partially moved out of the discharge area in the maintenance position, and in that a lifting device is provided, which is mounted to the processing plant and at least partially supports the transfer belt in the maintenance position by means of a lifting setup, in particular by means of a hoist.

Such a solution greatly facilitates the maintenance of the processing plant for a user. To make the discharge area behind the screen unit accessible, the user can use the actuators on the machine side to move the transfer belt out of the pick-up area to the maintenance position. No external machine is required for this purpose. In addition, the lifting devices secure the transfer belt in the maintenance position. For this purpose, a hoist that can be attached to the lifting device holds the transfer belt. Preferably, the traverse provided by the actuator is so large that more than half of the width of the pickup area/discharge area of the screen can be made accessible. When the transfer belt is in the maintenance position, the user can perform any required maintenance work in the pick-up area/discharge area of the screen. For instance, the user can clean this area. It is also conceivable that maintenance work can then be easily performed on the screen unit itself. For instance, a screen lining of the screen unit can be replaced using the now accessible pick-up area/discharge area of the screen.

According to an embodiment of the invention, provision may be made for the lifting device to be swiveled from a rest position into a swung-out carrying position by means of a swivel bearing. In the rest position, the lifting devices can be folded onto the processing plant to save space. This has advantages not only when the processing plant has to be prepared in a space-saving way for transport purposes.

In this case, a simple design and stable construction is obtained for the swivel bearing if provision is made for the lifting device to comprise two bearing plates spaced apart from each other, which are fastened to a machine frame of the processing plant, for a bearing piece to be held between the bearing plates, and for the bearing piece to be swivel-connected to the two bearing plates by means of a bearing pin.

Another embodiment of the invention is such that the lifting device comprises a support arm, which protrudes from the/a machine frame in the carrying position and that the support arm bears a support device, which is adjustably disposed on the support arm in the direction of the extension of length of the support arm. The hoist for the transfer belt can be coupled to the support device. Because the support device on the support arm can be adjusted, the motion of the transfer belt can be guided between its working position and the maintenance position. The cantilevered support arm provides sufficient room for motion of the support device to support the transfer belt on its way from the working position to the carrying position, at least in segments.

A stable and, at the same time, compact design is achieved if provision is made for the support device to comprise a roller bracket, on which idlers are rotatably mounted, and the idlers roll on a roller guide of the support arm when the support device is adjusted relative to the support arm, wherein the roller guide is preferably formed by a profiled section of the support arm, particularly preferably by a flange of a T-beam or an I-beam. The support device can then be adjusted in the manner of a trolley on the support arm when the transfer belt is moved from the working position to the maintenance position (and vice versa). Preferably, the support device can be interchangeably connected to the support arm. This setup has the advantage that the support device can be attached to the lifting device when the transfer belt needs to be moved to the maintenance position. When the transfer belt has been returned to its working position after maintenance has been completed, the support device can then be removed again and stored safely. Preferably, the support device can also be attached to and used with at least one other lifting device on the machine.

In order to safely support the transfer belt when it is moved from the working position to the maintenance position, the lifting device in an embodiment of the invention can be disposed either below the transfer belt or above the transfer belt.

Preferably, however, for good accessibility and ease of operation, provision is made for the lifting device to be disposed above the transfer belt. In that case, the design can be such that the support device comprises a hoist carrier and that the transfer belt is suspended from the hoist carrier in the maintenance position by means of the hoist and its end facing the receiving area preferably rests on the actuator. The cantilevered end of the transfer belt is again securely supported by the lifting device. If, in addition, the end of the transfer belt facing the pick-up area rests on the actuator, then the lifting device does not have to bear the entire load of the transfer belt. Part of the load can then be transferred to the machine frame via the actuator.

According to an embodiment of the invention, provision may be made for the transfer belt to comprise a beam, on which two deflection rollers are mounted, for an endless circulating conveyor belt to be guided around the deflection rollers in such a way that a slack side and a tight side result, for at least one coupling piece to be coupled to the beam, to which the hoist is coupled in the maintenance position in an area of the beam which is moved out of the receiving area in the maintenance position, preferably in the area of the deflection roller. Based on such a solution, the transfer belt can be held securely in the maintenance position at its cantilevered end. Preferably, no additional means are then required to hold the transfer belt at its cantilevered end.

According to the another embodiment of the invention, provision may further be made for the transfer belt to comprise one or more front support bodies and one or more rear support bodies, for the at least one front support body to be disposed in an area of the transfer belt facing away from the receiving area in the maintenance position of the transfer belt and for the at least one rear support body to be disposed in an area of the transfer belt facing towards the receiving area in the maintenance position of the transfer belt, and for the support bodies to be supported on a support rail in the working position to support the transfer belt indirectly or directly on the machine frame. The front and rear support bodies can safely support the transfer belt on a support rail in the working position. For instance, if the support bodies are designed appropriately, the loads occurring during operation can be safely transferred via the support bodies. If the transfer belt is to be moved from the working position to the maintenance position, the at least one front support body can be lifted off the support rail, which is preferably possible using the lifting device. Then the transfer belt can be moved from the working position to the maintenance position. For instance, the rear support body or bodies remain in contact with the support rail to guide the adjustment motion and preferably to transfer a part of the load of the transfer belt via the support rail.

In that case, it is conceivable that the support bodies are formed by guide rollers, which are rotatably mounted on the transfer belt and which, in the working position, are supported on a track surface or on track surfaces of the support rail designed as a guide rail. The guide rollers can be used to reliably guide the motion of the transfer belt.

A processing plant in an embodiment of the invention can also be characterized in that the actuator can be used to bring the transfer belt into at least two mutually offset working positions.

For instance, in a first working position, the transfer belt can feed the processing material coming from the screen unit to a discharge belt, for instance a return belt, and in a second working position, the transfer belt can, for instance, convey the processing material not onto the discharge belt, but laterally out of the working area of the processing plant.

It is also conceivable that different discharge positions for the transfer belt are implemented in the various working positions. In other words, the transfer belt can be disposed in the receiving area in a to a limited extent longitudinally displaceable manner. In this way, the distance of the discharge point of the transfer belt relative to the feed point of a subsequent discharge belt can be adjusted to be able to adapt the discharge point of the transfer belt to different belt speeds (for instance, due to different speeds of the drive motor). For instance, depending on the conveying speed of the transfer belt, the discharge position can be changed to set the desired discharge point for the processing material that is discharged from the transfer belt.

To secure the maintenance position of the transfer belt in a simple manner, provision may be made for the travel of the at least one rear support body in the maintenance position to be limited at a stop, which is disposed indirectly or directly on the machine frame.

BRIEF DESCRIPTION OF THE DRAWINGS

An embodiment of the invention is explained in greater detail below based on an exemplary embodiment shown in the drawings. In the Figures.

DETAILED DESCRIPTION

Figure 1:
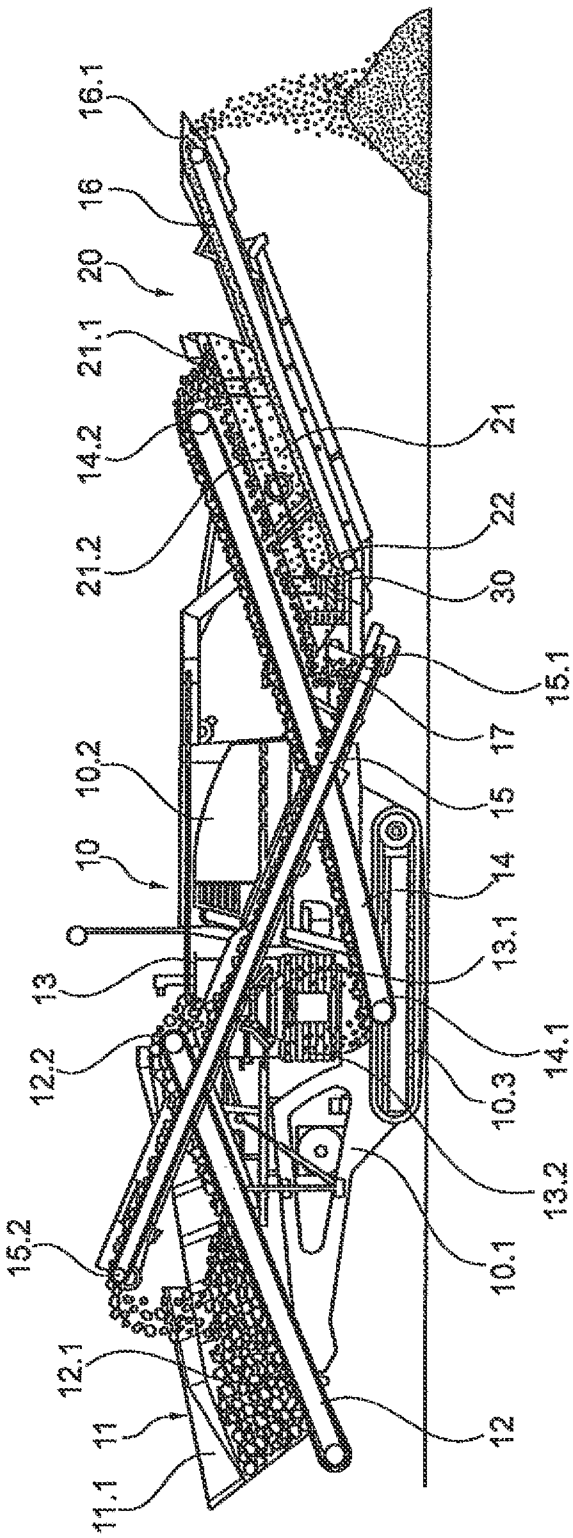
FIG. 1 shows a side view and a schematic diagram of a processing plant.

FIG. 1 shows a mobile processing plant 10, in which, in this exemplary embodiment, a crusher unit 13 is combined with a screen unit 20. Processing plants 10 according to an embodiment of the invention can also be designed as screening plants without a crusher unit 13 and accordingly comprise a screen unit 20. The crusher unit 13 may also be referred to as a crusher 13. The screen unit 20 may also be referred to as a screen 20.

The processing plant 10 has a machine frame 10.1, which is supported by two crawler tracks 10.3. The crawler tracks 10.3 can be used to move the processing plant 10, in FIG. 1 in the image plane from left to right (and vice versa). Different speeds of the left and the right crawler track cab be applied to drive curves or the processing plant can be turned on the spot about the vertical axis.

The machine frame 10.1 bears a drive 10.2. This drive 10.2 is designed as an internal combustion engine and can be coupled to a hydraulic unit. Hydraulic motors of the hydraulic unit can drive individual plant components. In addition or alternatively, provision may also be made for the drive 10.2 to generate electrical energy via a generator, which electrical energy is supplied to individual electric motors of the processing plant 10.

The processing plant 10 has a feed unit 11 including a feed hopper 11.1. A conveyor device 12, for instance a circulating conveyor belt, is disposed below the feed hopper 11.1. The conveyor 12 is assigned to the feed hopper 11.1 including a feed area such that processing material filled into the feed hopper 11.1 is passed the feed area 12.1 and is conveyed to a transfer area 12.2 by the conveyor 12. An excavator or wheel loader can be used to fill the processing material into the feed hopper 11.1.

In the transfer area 12.2, the processing material is routed from the conveyor 12 into a crusher unit 13. In this exemplary embodiment, the processing material is filled directly into the crusher unit 13. However, it is also conceivable that a further conveying device and/or a pre-screen is/are provided, via which the processing material enters the crusher unit 13.

The crusher unit 13 has a crusher housing 13.2. A crushing rotor 13.1 is located in this crusher housing. In this exemplary embodiment, the crushing rotor 13.1 forms a cone crusher. Instead of the crushing rotor 13.1, another crushing unit can also be used, for instance a jaw crusher or a rotary impact crusher.

A crusher discharge conveyor 14 having a feed end 14.1 is disposed below the crusher unit 13. The crusher discharge conveyor 14 is again designed as an endless circulating conveyor belt and has a discharge area 14.2 opposite from the feed end 14.1. The discharge area 14.2 is disposed above a screen unit 20.

The screen unit 20 has a screen tray 21. Inside, two screen decks 21.1, 21.2 are disposed one above the other. Within the scope of an embodiment of the invention, it is also conceivable that only one screen deck 21.1 is disposed in the screen tray 21 or that more than 2 screen decks are disposed there.

The screen unit 20 has a screen transport direction, which, for a space-saving design, is preferably opposite or substantially opposite to the conveying direction of the crusher discharge conveyor 14, as shown in FIG. 1. The discharge area 14.2 of the crusher discharge conveyor 14 is disposed above the upper screen deck 21.1 and is assigned to the front end of the upper screen deck 21.1 in the transport direction.

The screen mesh width of the upper screen deck 21.1 is larger than the screen mesh width of the second screen deck 21.2 beneath. In this way, different target grain sizes can be screened out at the two screen decks 21.1 and 21.2.

A conveyor belt 16 is disposed below the screen deck 21.2. This conveyor belt 16 is preferably designed as an endless circulating conveyor belt 16. It picks up the processing material screened out by the lower screen deck 21.2 and conveys it to its discharge end 16.1. From there, the screened processing material can be dropped onto a stockpile, as FIG. 1 illustrates.

The processing material, which does not fall through the lower screen deck 21.2 due to its particle size, is routed along the screen deck 21.2 in the screen transport direction to a discharge area 22. There, this material leaves the screen unit 20 and falls onto a transfer belt 30.

The transfer belt 30 has an endless circulating conveyor belt 32. The conveying direction of the transfer belt 30 is transverse to the screen transport direction, in particular across the width of the processing plant 10 (essentially perpendicular to the image plane of FIG. 1).

The processing material, which owing to its grain size does not fall through the upper screen deck 21.1, reaches an oversize grain discharge 17 in the discharge area 22. The oversize grain discharge 17 can, as in this case, be designed as an endless circulating conveyor belt. The conveying direction of the oversize discharge 17 is transverse to the screen transport direction, in particular across the width of the processing plant 10.

The oversize grain discharge 17 extends at least across the entire width (in the direction of the image depth of FIG. 1) of the upper screen deck 21.1. Accordingly, the oversize grain discharge 17 can receive all of the material discharged from the screen deck 21.1 in the discharge area 22. This processing material is transported towards a return belt 15 via the oversize discharge 17. Accordingly, a discharge area of the oversize discharge 17 is disposed in a receiving area 15.1 of the return belt 15. A receiving hopper of the return belt 15 can be disposed in this receiving area 15.1 to better collect the material and feed it to the return belt 15. For the sake of clarity, this receiving hopper is not shown in FIG. 1.

The return belt 15 has a return belt discharge area 15.2. It is disposed above the receiving hopper 11.2. Accordingly, the processing material removed by the return conveyor 15 can be filled into the feed hopper 11.1.

Correspondingly, therefore, the processing material, which is conveyed from the oversize material discharge 17 to the return belt 15, can be routed to the crusher unit 13 for renewed processing.

As FIG. 1 shows, the transfer belt 30 preferably extends at least across the entire width (in the direction of the image depth of FIG. 1) of the lower screen deck 21.2. Accordingly, all the material discharged from the screen deck 21.2 in the discharge area 22 from the screen unit 20 is passed onto the transfer belt 30.

Figure 5:
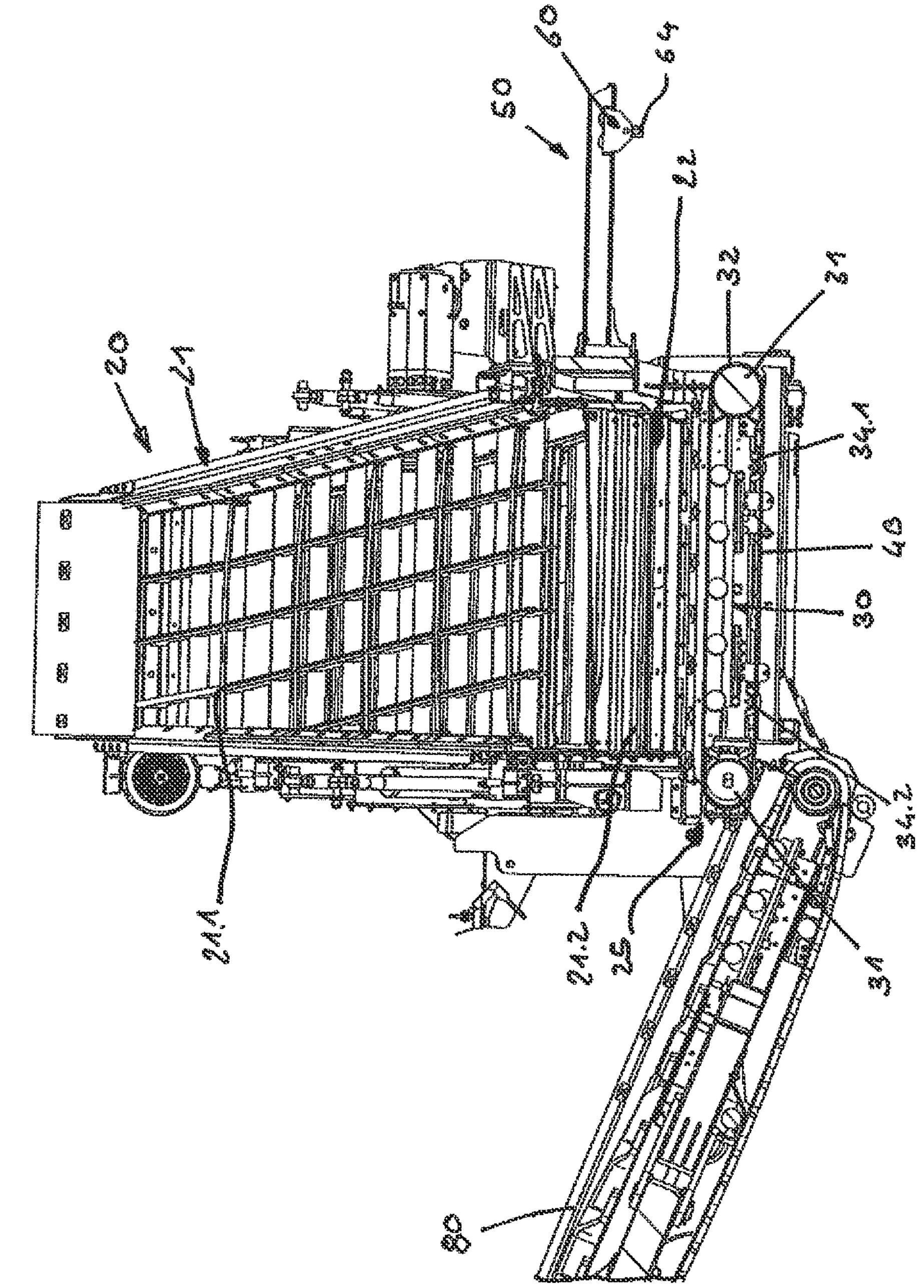

The processing material picked up by the transfer belt 30 is conveyed across the width of the processing plant 10 and fed onto a discharge belt 80 shown in FIG. 5. In FIG. 1, the discharge conveyor 80 is obscured by the machine body of the processing plant 10 and is therefore not visible in that illustration. The discharge conveyor 80 can be used to pile the material from the transfer conveyor 30 onto a stockpile, load it onto a waiting vehicle, or convey it to a downstream facility.

The screen unit 20 has the screen tray 21. It has two side walls 23 parallel to each other (see FIG. 3). The front of the screen tray 21 is closed off by a front wall. Vibratory drives 24 are provided in the area of the side walls 23. These vibratory drives 24 can be used to drive the two screen decks 21.1, 21.2 in the screen tray 21 and set them in an oscillatory motion. Owing to this oscillating motion and the inclined arrangement of the screen decks 21.1 and 21.2, a screen transport direction is created on the screen decks 21.1, 21.2, which points in the direction of the extension of length of the screen decks 21.1, 21.2 in the direction towards the discharge area 22. The two side walls 23 may be provided with a recess 26. The transfer belt 30 runs below the recesses 26.

Figure 2:
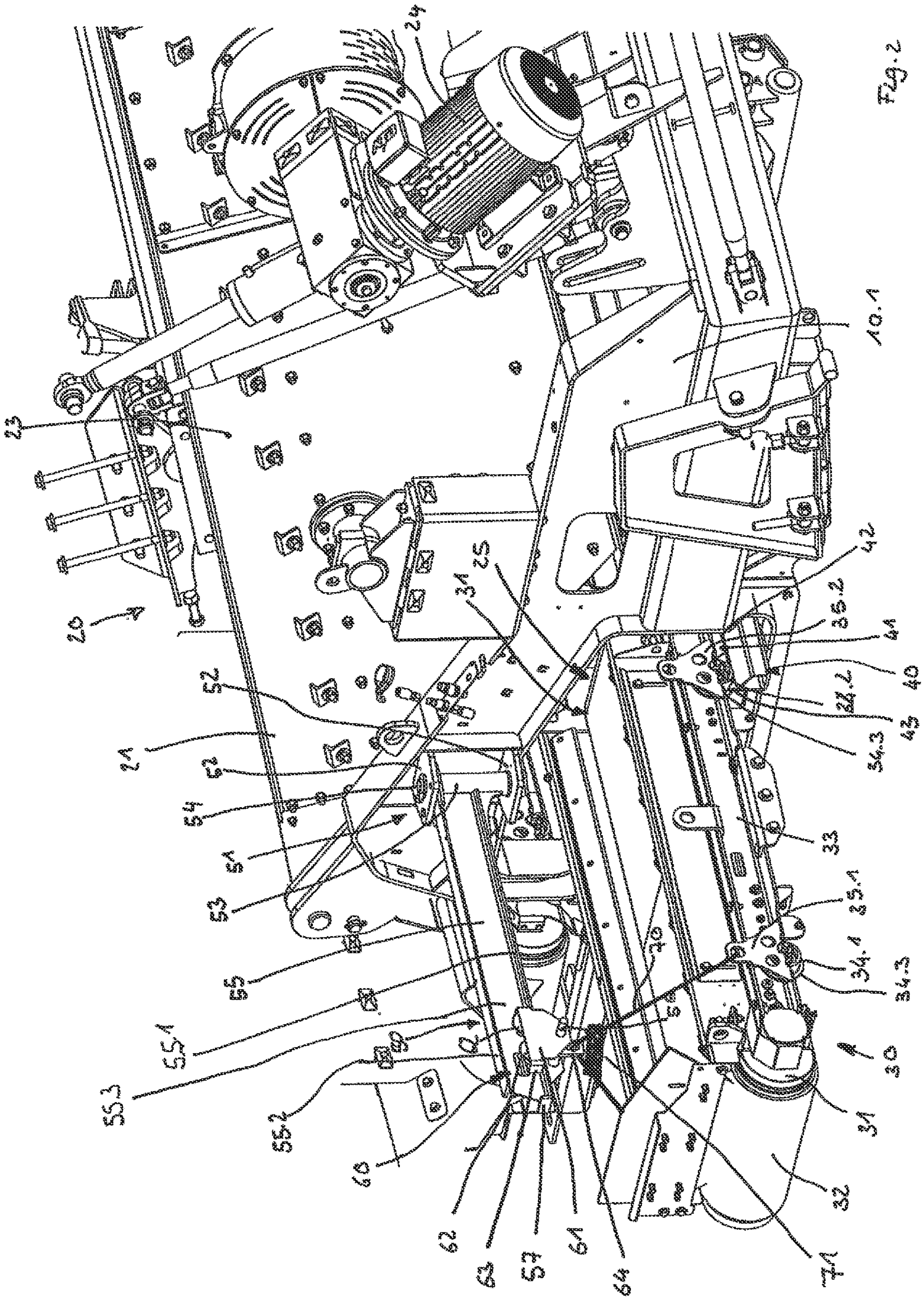
FIG. 2 shows a perspective view and partial representation of a screen unit of the processing plant of FIG. 1.

As FIG. 2 shows, the conveyor belt 32 of the transfer belt 30 is guided by two deflection rollers 31 having mutually parallel axes of rotation. This results in the upper strand on the top face of conveyor 32 and the bottom strand on the bottom side of conveyor 32. The processing material coming from the screen deck 21.2 can be transported away on the upper strand of the conveyor 32.

The transfer belt 30 has a beam 33 on which the two deflection rollers 31 are mounted. Support bodies 34.1, 34.2 are disposed on opposite ends of the beam 33. In this case, the front support bodies 34.1 are disposed in the area of one longitudinal end of the transfer belt 30 and the rear support bodies 34.2 are disposed at the opposite longitudinal end area of the transfer belt 30.

As illustrated in FIG. 2, guide rollers can form the support bodies 34.1 that are rotatably connected to the beam 33.

Preferably, provision is made for the front support bodies 34.1 and the rear support bodies 34.2 to be disposed on opposite longitudinal ends of the transfer belt 30.

A support rail 40 is assigned to each of the longitudinal ends of the transfer belt 30, wherein the two support rails 40 are installed in the receiving area 25 and extend along the width of the processing plant 10. The support rails 40 can be designed as hollow sections.

The support rails 40 have a track surface 41 that extends across the width of the processing plant 10. The track surface 41 of a support rail 40 is used to receive and support the front support body 34.1 and the rear support body 34.2 of a longitudinal end of the transfer belt 30 in the working position. This is illustrated, for instance, in FIG. 5, in which the two support bodies 34.1 and 34.2 are seated on the support rail 40.

FIG. 2 further illustrates that the support rail 40 may comprise a web 42 adjacent to the track surface 41, wherein the web 42 projects upwards. The web 42 interacts with a circumferential shoulder 34.3 of the support bodies 34.1, 34.2, which are designed as guide rollers, such that the shoulder 34.3 is guided on one side of the web 42, as FIG. 2 shows.

One or both support rails 40 have a stop 43 at their longitudinal end(s). The stop(s) 43 block(s) the support bodies 34.1, 34.2 when they rest against it/them. In the maintenance position shown in FIG. 2, the rear support body 34.2 is blocked at the stop 43.

As FIG. 2 further shows, a lifting device 50 is mounted at the processing plant 10. The lifting device 50 has a support arm 55 that is swivel-coupled to the processing plant 10 via a swivel bearing 51.

The swivel bearing 51 may be designed to comprise two spaced apart bearing plates 52. A bearing piece 53 is inserted between the bearing plates 52. This bearing piece 53 is formed as a hollow part and accommodates a bearing pin 54. The bearing pin 54 is captively held to at least one of the bearing plates 52.

The bearing piece 53 is connected to the support arm 55. Accordingly, the support arm 55 can be swiveled via the bearing piece 53 with respect to the bearing pin 54 and thus with respect to the bearing plates 52, wherein the swivel axis is vertical.

The support arm 55 is formed by a section element. This section element can be an I-beam, for instance, which comprises a top flange 55.2 and a bottom flange. A web 55.3 connects the top flange 55.2 to the bottom flange. The bottom flange forms a roller guide 55.1.

A counter stop 57 is provided on the support arm 55 at the end facing away from the swivel bearing 51.

The lifting device 50 bears a support device 60. The support device 60 can preferably be interchangeably connected to the lifting device 50. Accordingly, the support device 60 may be attached to or detached from the lifting device 50 as required.

The support device 60 has a roller bracket 61, on which idlers 62 are rotatably mounted. Preferably, two idlers 62 are used on each side of the web 55.3 of the support arm 55. The idlers 62 are attached to the roller bracket 61 in such a way that they can roll on the upper side of the bottom flange/roller guide 55.1. Accordingly, the support device 60 can be moved in the longitudinal direction of the support arm 55, similar to a trolley.

A control stop 63 is provided at the roller bracket 61. The stop 63, which strikes against the counter stop 57, limits the positioning motion of the support device 60 in the direction of the longitudinal end of the support arm 55. In the opposite direction, the roller bracket 61 strikes against the bearing piece 53.

The support device 60 has a hoist carrier 64. This hoist carrier 64 may be designed as a tab that projects downwards from the support device 60.

For instance, the roller bracket 61 may comprise a retaining piece 56, for instance shaped like a stud, which holds the hoist carrier 64 below the support arm 55.

A hoist 70 may be attached to the hoist carrier 64 of the support device 60. The hoist consists of floppy supporting elements, for instance chains, ropes or the like. Preferably, these support elements are attached to the hoist carrier 64 through the intermediary of pulling devices 71, as FIG. 2 shows.

The hoist 70 may be interchangeably coupled to coupling members 35.1 of the transfer belt 30 facing away from the hoist carrier 64. The coupling pieces 35.1 are disposed on both longitudinal ends of the transfer belt 30. The coupling pieces 35.1 can be designed as lugs, which comprise a receiving eye projecting upwards, to which the hoist 70 can be attached. The coupling pieces 35.1 are preferably attached to the beam 33 at the end projecting in the maintenance position of the transfer belt. Preferably, the coupling pieces 35.1 are attached to the beam 33 in the area of the front support bodies 34.1.

Alternatively, a cross bar can be used, which extends between the two longitudinal ends of the transfer belt above the upper strand of the transfer belt. The hoist 70 can be coupled to this cross bar.

FIG. 2 further shows that rear coupling pieces 35.2 can also be mounted to the transfer belt 30, wherein the rear coupling pieces 35.2 are preferably identical in design to the coupling pieces 35.1 to reduce the amount of parts required. The rear coupling pieces 35.2 are disposed in the end area of the transfer belt 30 facing the receiving area 25. Again, the rear coupling pieces 35.2 can preferably be mounted in the area of the rear support bodies 34.2. The front and rear coupling pieces 35.1 and 35.2 may be used when the transfer belt is to be completely removed from the processing plant 10, for instance using a suitable carrying vehicle, such as a wheel loader or a forklift.

The function of the device according to an embodiment of the invention is described in more detail below. In FIG. 5, the transfer belt 30 is in its working position in the receiving area 25. If this receiving area 25 is to be made accessible for maintenance or servicing work, the lifting device 50 is first swung out from a rest position folded against the side of the screen tray 21 into the carrying position shown in FIG. 5. In so doing, the swivel bearing 51 can be used to swing the support arm 55. Subsequently, the support device 60 can be installed with the support arm 55, wherein the idlers 62 then rest on the roller guide 55.1 of the support arm 55.

Now the support device 60 can be moved in the direction towards the swivel bearing 51. Then the transfer belt 30 is moved from its working position to the stops 43. The transfer belt 30 can be moved on the support rails 40 until the front support bodies 34.1 rest against the stop 43 of the support rail 40, thus blocking any further motion of the transfer belt 30.

The hoist 70 is then attached to the hoist carrier 64 and to the coupling pieces 35.1.

The pulling device 71 is integrated in the hoist 70. A pulley block, for instance, can be used as the pulling device 71. This pulling device 71 can be used to shorten the traction ropes of the hoist 70 and thus the transfer belt 30 at the coupling pieces 35.1 can be lifted a little against the direction of gravity. In the process, the front support bodies 34.1 disengage from the stop 43 of the support rail 40. Now the transfer belt 30 can be moved further on the support rails 40, wherein the rear support bodies are adjusted on the support rails 40. The now cantilevered end of the transfer belt 30 is securely held to the lifting device 50. A part of the load of the transfer belt 30 is further transferred via the support rails 40.

Any further adjustment of the transfer belt 30 now occurs in the direction of the extension of length of the support rails 40. The support device 60 extends in the longitudinal direction of the support arm 55. This positioning motion is limited by the rear support bodies 34.2, which come to rest against the stops 43 in the maximum set position. This maximum set position is equal to the maintenance position, in which the pick-up area 25 is now easily accessible to the user.

Figure 3:
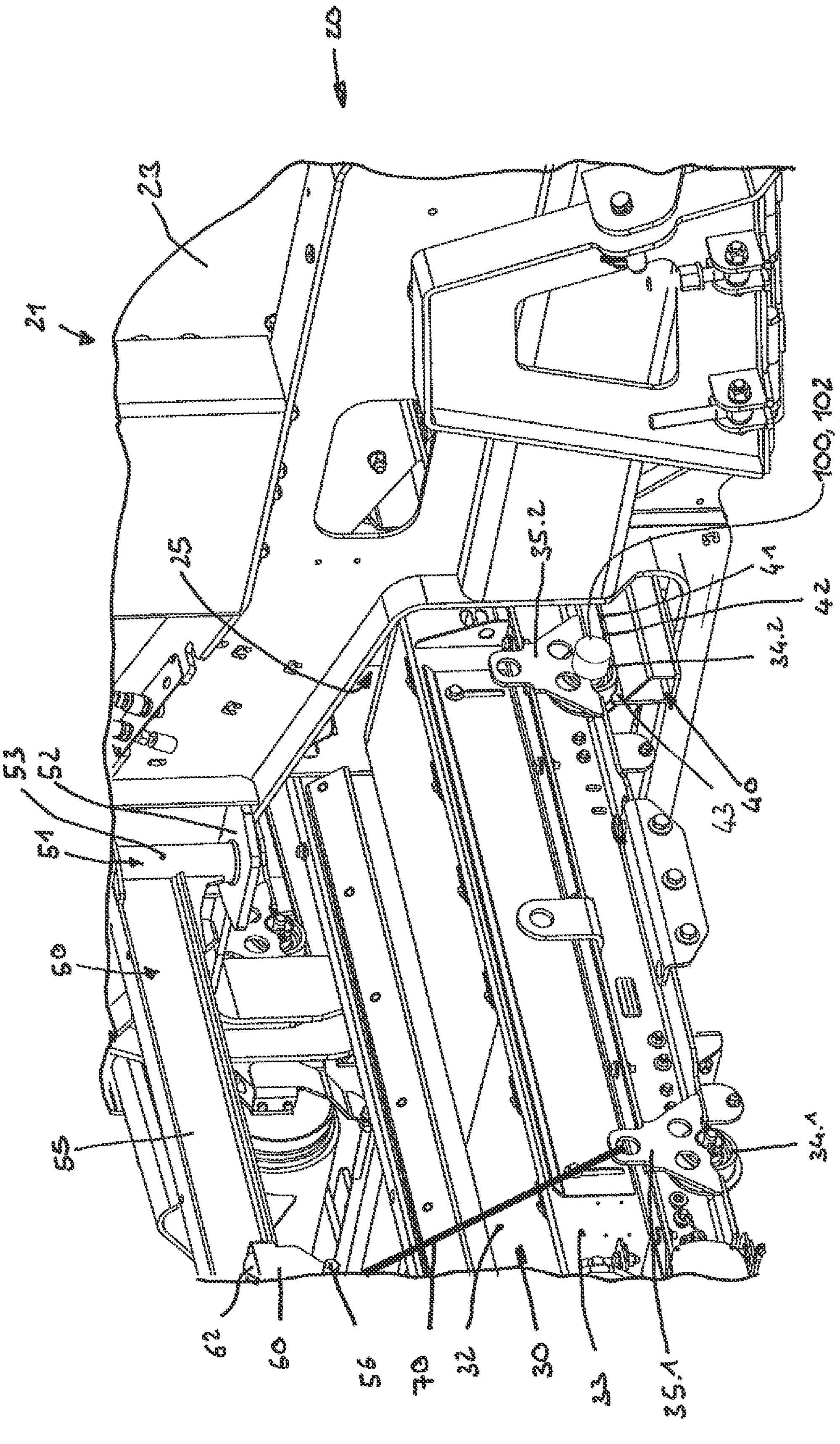
FIG. 3 shows a detail representation of the representation of FIG. 2.
Figure 4:
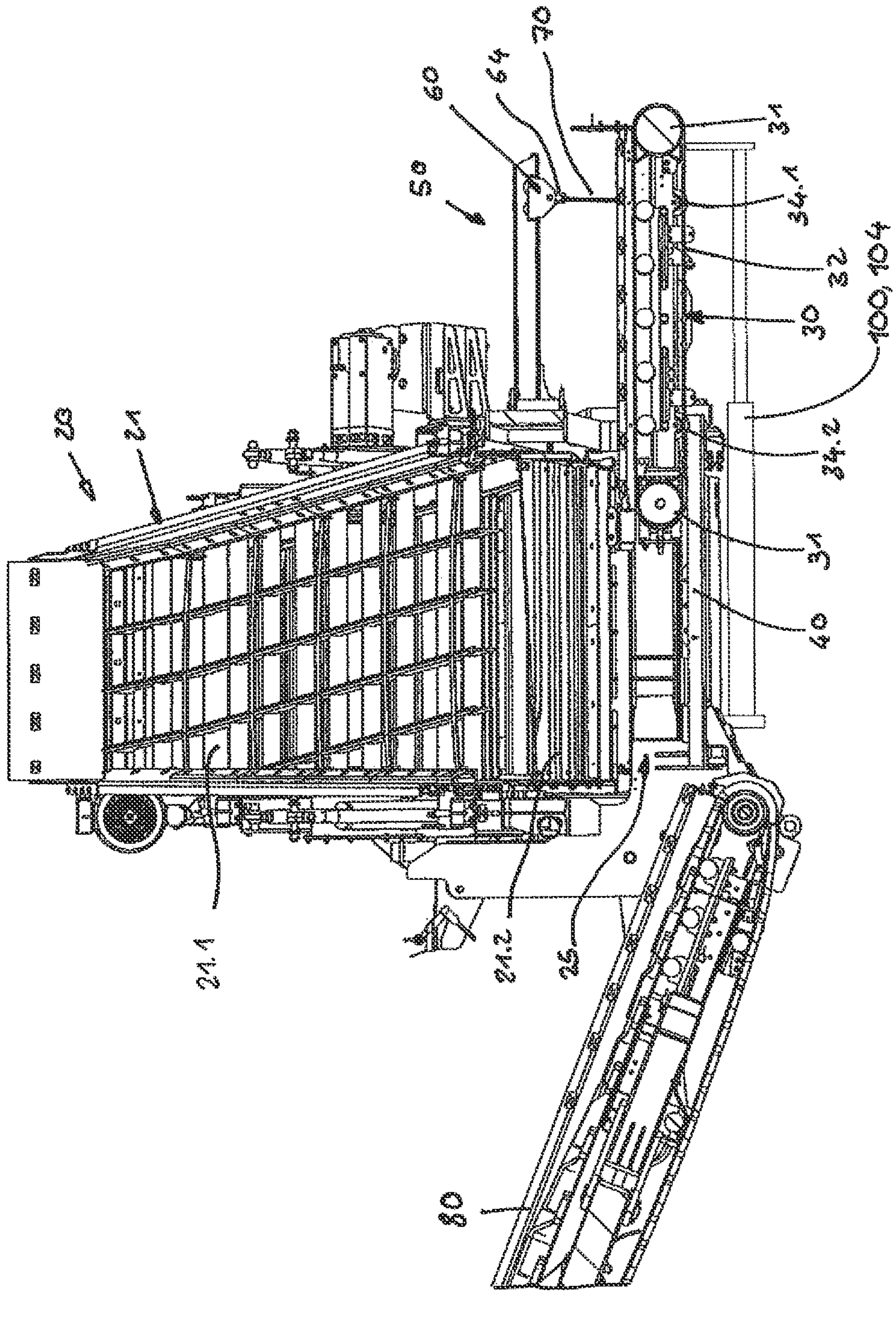
FIG. 4 shows a front view of the structural unit of FIGS. 2 and 3 and FIG. 5 shows the representation of FIG. 4 in an altered operating position.

The processing plant may include an actuator 100 to move the transfer belt 30 from the working position to a maintenance position along its conveying direction. In one embodiment schematically illustrated in FIG. 3 the actuator 100 may include a drive motor 102 attached to one or more of the rear support bodies 34.2 to rotate the rear support bodies 34.2 to drive the transfer belt 30 along the support rails 40. In the embodiment of FIG. 3 the rear end of the transfer belt 30 may be described as resting on the actuator 100. In a further embodiment schematically illustrated in FIG. 4 the actuator 100 may include a hydraulic cylinder 104 connected between the machine frame 10.1 and the beam 33 of the transfer belt 30.

Of course, the transfer belt 30 does not have to be moved all the way to the maintenance position shown in FIG. 2. Rather, only a partial extension of the transfer belt 30 out of the receiving area 25 may occur. This also results in a suitable maintenance position. Preferably, the traverse of the positioning motion of the transfer belt 30 is at least half the width of the screen unit 20 (the width is perpendicular to the image plane in FIG. 1).

After the maintenance work has been completed, the transfer belt can simply be pushed back into the receiving area 25 from the maintenance position. In the process, the front support bodies 34.1 are again lifted over the stops 43. The pulling devices 71 then lower the transfer belt in the area of the coupling pieces 35.1, to re-seat the front support bodies 34.1 on the track surface 41 of the support rail 40.

Finally, the support device 60 can again be removed from the support arm 55 and the support arm can be folded sideways by means of the swivel bearing 51.

The processing plant 10 is then again available for operation.

The invention claimed is:

1. A processing plant, comprising:

a machine frame;

a crusher;

a screen configured to receive material being processed from the crusher, the screen including at least one screen deck and a discharge area where the material being processed exits the screen;

a transfer belt movable between a working position and a maintenance position, the transfer belt in the working position being positioned to receive the material being processed from the screen, and the transfer belt in the maintenance position being moved at least in part away from the discharge area; and a lifting device supported from the machine frame and including a hoist configured to support the transfer belt in the maintenance position;

wherein the lifting device includes a support arm protruding from the machine frame, and a trolley disposed on the support arm and adjustable in position along a length of the support arm.

2. The processing plant of claim 1, wherein:

the lifting device is mounted to the machine frame by a swivel bearing such that the lifting device can be swiveled from a rest position into a swing-out carry position.

3. The processing plant of claim 1, wherein:

the support arm includes a roller guide; and the trolley includes a roller bracket and a plurality of idlers rotatably mounted on the roller bracket, the idlers rolling on the roller guide of the support arm when the trolley is adjusted in position along the length of the support arm.

4. The processing plant of claim 3, wherein:

the support arm includes a T-beam or an I-beam, and the roller guide is a flange of the T-beam or the I-beam.

5. The processing plant of claim 1, wherein:

the transfer belt includes a beam, at least two deflection rollers mounted on the beam, and an endless circulating conveyor belt guided around the deflection rollers such that the endless circulating conveyor belt includes a slack side and a tight side; and the hoist is coupled to the beam by at least one coupling piece when the transfer belt is in the maintenance position.

6. The processing plant of claim 1, wherein:

the transfer belt is received in a receiving area of the processing plant when the transfer belt is in the working position;

the processing plant further includes a support rail;

the transfer belt includes at least one front support body and at least one rear support body supported on the support rail so as to support the transfer belt indirectly or directly on the machine frame when the transfer belt is in the working position; and the at least one front support body is disposed outside of the receiving area when the transfer belt is in the maintenance position.

7. The processing plant of claim 6, wherein:

at least one of the support bodies is a guide roller rotatably mounted on the transfer belt and in the working position of the transfer belt the guide roller is supported on a track surface of the support rail such that the track surface of the support rail guides the guide roller.

8. The processing plant of claim 6, further comprising:

a stop disposed directly or indirectly on the machine frame such that the at least one rear support body engages the stop to limit movement of the at least one rear support body along the support rail when the transfer belt is in the maintenance position.

9. The processing plant of claim 1, wherein:

the transfer belt is movable between at least two working positions.

10. A processing plant, comprising:

a machine frame;

a crusher;

a screen configured to receive material being processed from the crusher, the screen including at least one screen deck and a discharge area where the material being processed exits the screen;

a transfer belt movable between a working position and a maintenance position, the transfer belt in the working position being positioned to receive the material being processed from the screen, and the transfer belt in the maintenance position being moved at least in part away from the discharge area; and a lifting device supported from the machine frame and including a hoist configured to support the transfer belt in the maintenance position;

wherein the lifting device is mounted to the machine frame by a swivel bearing such that the lifting device can be swiveled from a rest position into a swing-out carry position;

wherein the lifting device includes two bearing plates spaced apart from each other, the two bearing plates being fastened to the machine frame of the processing plant; and wherein the swivel bearing includes a bearing piece located between the two bearing plates, and a bearing pin attached to at least one of the two bearing plates and extending through the bearing piece.

11. A processing plant, comprising:

a machine frame;

a crusher;

a screen configured to receive material being processed from the crusher, the screen including at least one screen deck and a discharge area where the material being processed exits the screen;

a transfer belt movable between a working position and a maintenance position, the transfer belt in the working position being positioned to receive the material being processed from the screen, and the transfer belt in the maintenance position being moved at least in part away from the discharge area; and a lifting device supported from the machine frame and including a hoist configured to support the transfer belt in the maintenance position;

wherein the lifting device is disposed above the transfer belt relative to a direction of gravity, and the lifting device includes a trolley, the transfer belt being suspended from the trolley by the hoist when the transfer belt is in the maintenance position.

* * * * *